United States Patent
Choi

(10) Patent No.: US 10,029,310 B2
(45) Date of Patent: Jul. 24, 2018

(54) POWER TRANSFER DEVICE, ORBITAL PIPE CUTTING DEVICE AND HYDRAULIC CHUCKING DEVICE

(71) Applicant: DCSENG CO., LTD., Daejeon (KR)

(72) Inventor: Insung Choi, Daejeon (KR)

(73) Assignee: DCSENG CO., LTD., Daejeon (KR)

( * ) Notice: Subject to any disclaimer, the term of this patent is extended or adjusted under 35 U.S.C. 154(b) by 0 days.

(21) Appl. No.: 14/786,741

(22) PCT Filed: Mar. 13, 2015

(86) PCT No.: PCT/KR2015/002486
§ 371 (c)(1),
(2) Date: Oct. 23, 2015

(87) PCT Pub. No.: WO2015/141998
PCT Pub. Date: Sep. 24, 2015

(65) Prior Publication Data
US 2017/0036273 A1    Feb. 9, 2017

(30) Foreign Application Priority Data

Mar. 17, 2014 (KR) ......................... 10-2014-0030771
Apr. 17, 2014 (KR) ......................... 10-2014-0045728

(51) Int. Cl.
*B23B 5/08* (2006.01)
*B23B 5/14* (2006.01)
(Continued)

(52) U.S. Cl.
CPC ................ *B23B 5/08* (2013.01); *B23B 3/26* (2013.01); *B23B 5/14* (2013.01); *B23B 31/101* (2013.01);
(Continued)

(58) Field of Classification Search
CPC .... B23B 5/08; B23B 3/26; B23B 5/14; B23B 31/101; B23B 31/1276; B23B 31/16287; B23Q 7/042
See application file for complete search history.

(56) References Cited

U.S. PATENT DOCUMENTS 2,271,582 A    2/1942   Dixon

FOREIGN PATENT DOCUMENTS

DE    2533639 A1    2/1977
DE    2558863 A1 *  7/1977   ....... B23B 31/16287
(Continued)

OTHER PUBLICATIONS

European Patent Office, Extended European Search Report, Application No. 15765404.7, dated Oct. 10, 2016.
(Continued)

*Primary Examiner* — Alan Snyder
(74) *Attorney, Agent, or Firm* — Yakov Sidorin; Victoria Cook; Quarles & Brady LLP

(57) ABSTRACT

Disclosed are a power transfer device for transferring external power to a rotary body, a pipe cutting device using the power transfer device and a hydraulic chucking device using the power transfer device. The power transfer device is configured to transfer external power to a rotary body coupled to one side of a main body. The power transfer device includes at least one double-action interlocking cylinder mounted to a rear surface of the rotary body and provided with a rod protruding toward the main body, a push unit installed in the main body and provided with at least one pusher protruding toward the rotary body, and a bearing disposed between the pusher of the push unit and the rod of the interlocking cylinder and configured to allow relative rotation of the pusher and the rod and to transfer power between the pusher and the rod.

7 Claims, 13 Drawing Sheets

(51) Int. Cl.
*B23B 3/26* (2006.01)
*B23B 31/10* (2006.01)
*B23B 31/12* (2006.01)
*B23B 31/16* (2006.01)
*F15B 7/00* (2006.01)
*F15B 15/06* (2006.01)
*F15B 15/14* (2006.01)
*B23Q 7/04* (2006.01)

(52) U.S. Cl.
CPC .... *B23B 31/1276* (2013.01); *B23B 31/16287* (2013.01); *F15B 7/008* (2013.01); *F15B 15/06* (2013.01); *F15B 15/1428* (2013.01); *F15B 15/1447* (2013.01); *B23Q 7/042* (2013.01)

(56) References Cited

FOREIGN PATENT DOCUMENTS

| | | |
|---|---|---|
| DE | 102012112189 A1 | 6/2014 |
| EP | 2085169 A1 | 8/2009 |
| JP | S5054984 A | 5/1975 |
| JP | S5969212 A | 4/1984 |
| JP | H06155141 A | 6/1994 |
| JP | H06206102 A | 7/1994 |
| JP | H07332315 A | 12/1995 |
| JP | H081583 A | 1/1996 |
| JP | H10180530 A | 7/1998 |
| JP | 3106291 B2 | 11/2000 |
| JP | 2010115747 A | 5/2010 |
| JP | 2011510823 A | 4/2011 |
| KR | 2019990012096 U | 4/1999 |
| KR | 101270563 B1 | 6/2013 |

OTHER PUBLICATIONS

PCT International Search Report, PCT/KR2015/002486, dated Jul. 6, 2015.

Japan Patent Office, Notification of Reasons for Refusal, Patent Application No. 2016-508917, dated Jun. 28, 2016, 7 pages.

* cited by examiner

[Fig. 1]
PRIOR ART
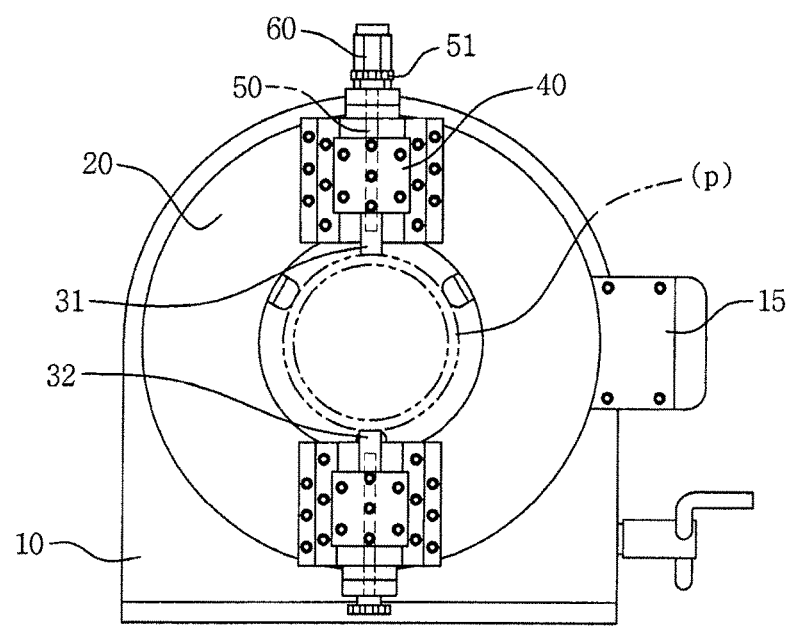

[Fig. 2]
PRIOR ART
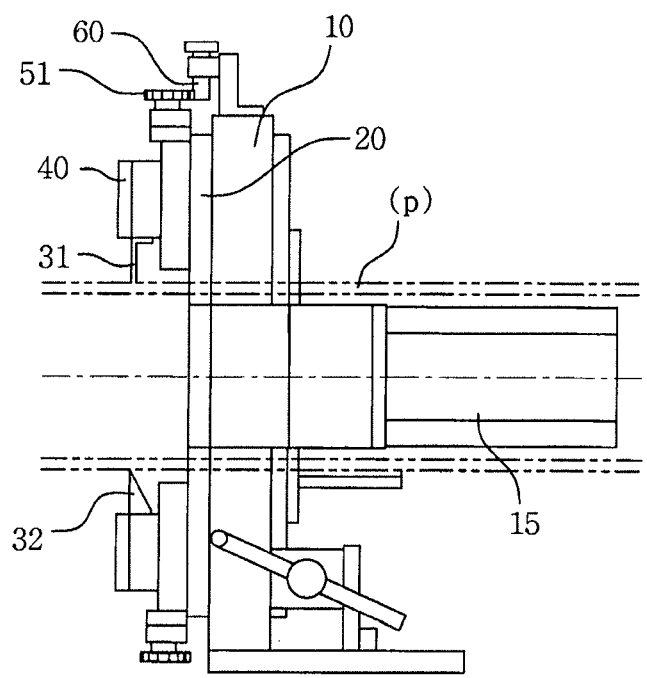

[Fig. 3]
PRIOR ART
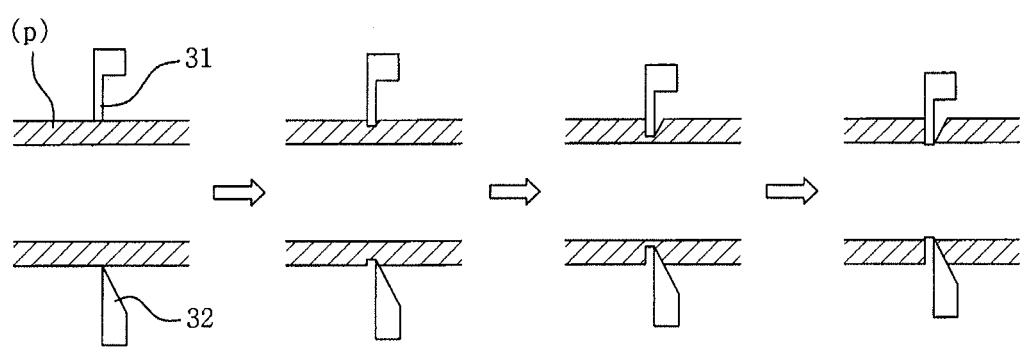
[Fig. 4]
PRIOR ART
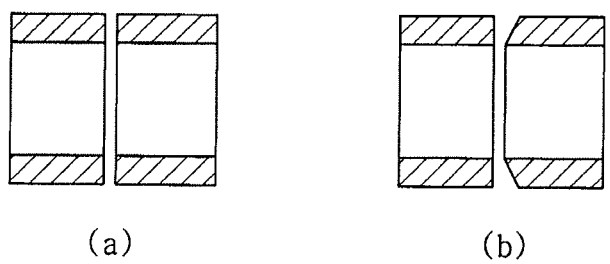
(a)　　　　　　(b)

[Fig. 5]
PRIOR ART
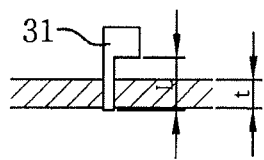
[Fig. 6]
PRIOR ART
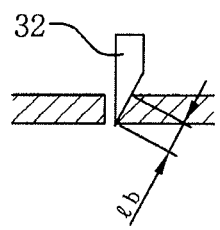
[Fig. 7]
PRIOR ART
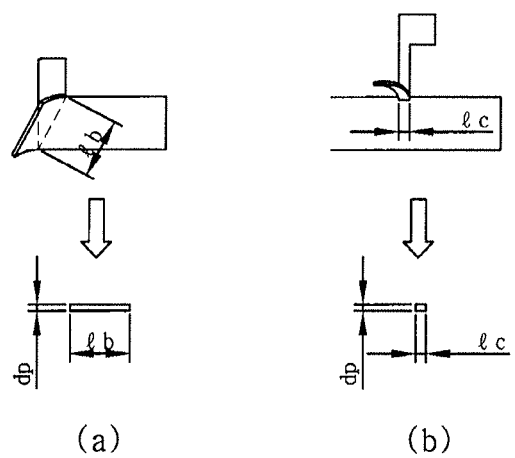
(a)        (b)

[Fig. 8]
PRIOR ART
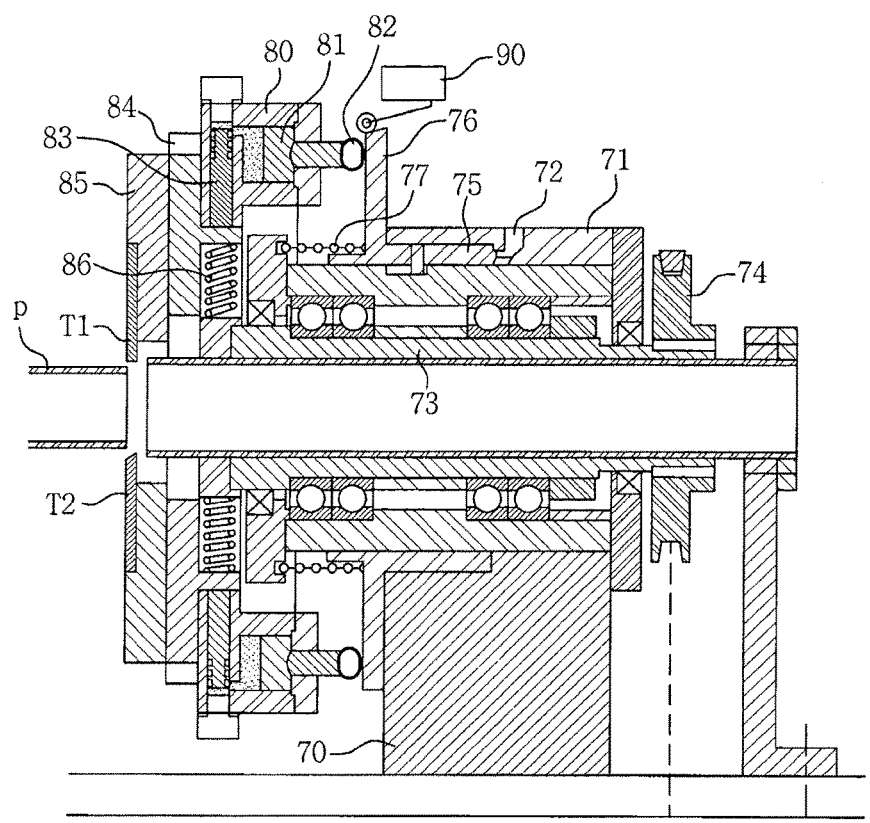

[Fig. 9]
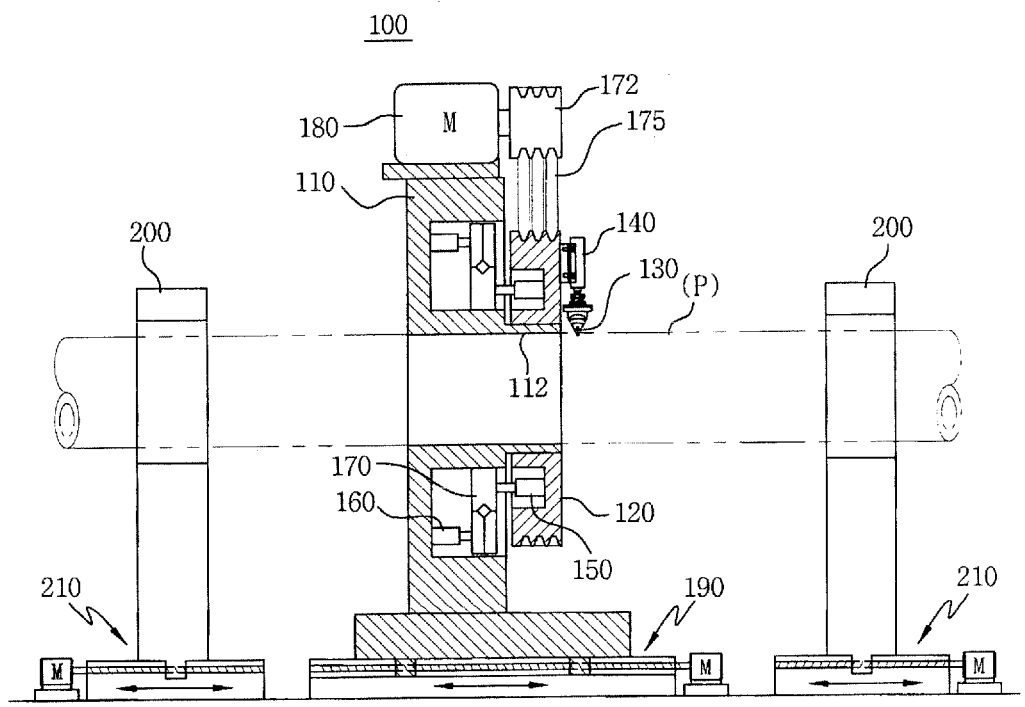

[Fig. 10]
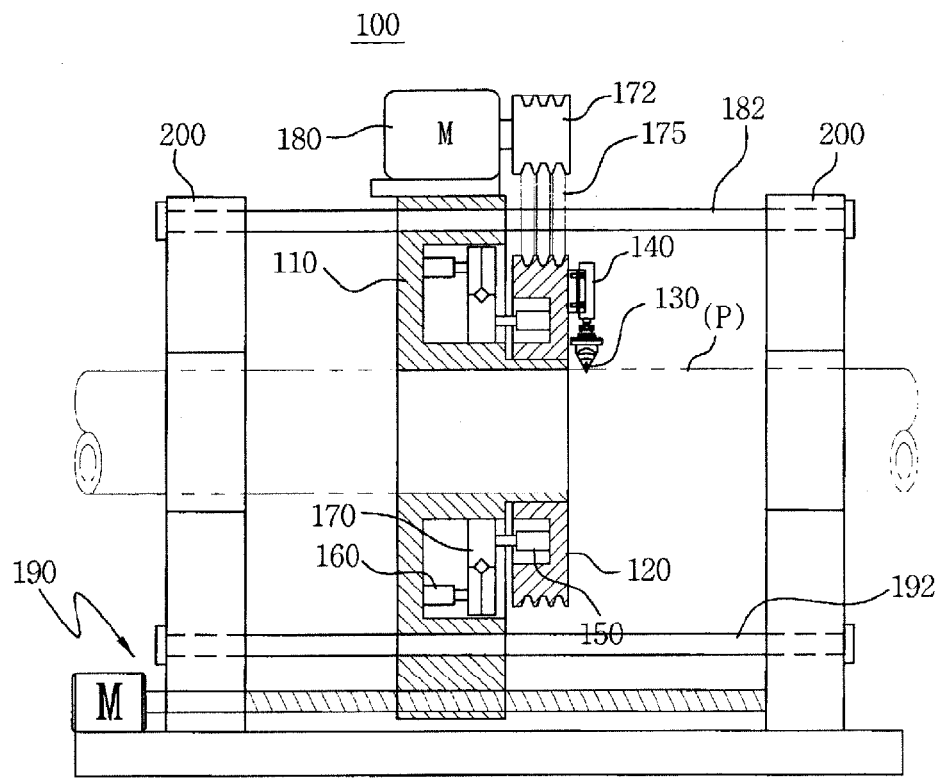
[Fig. 11]
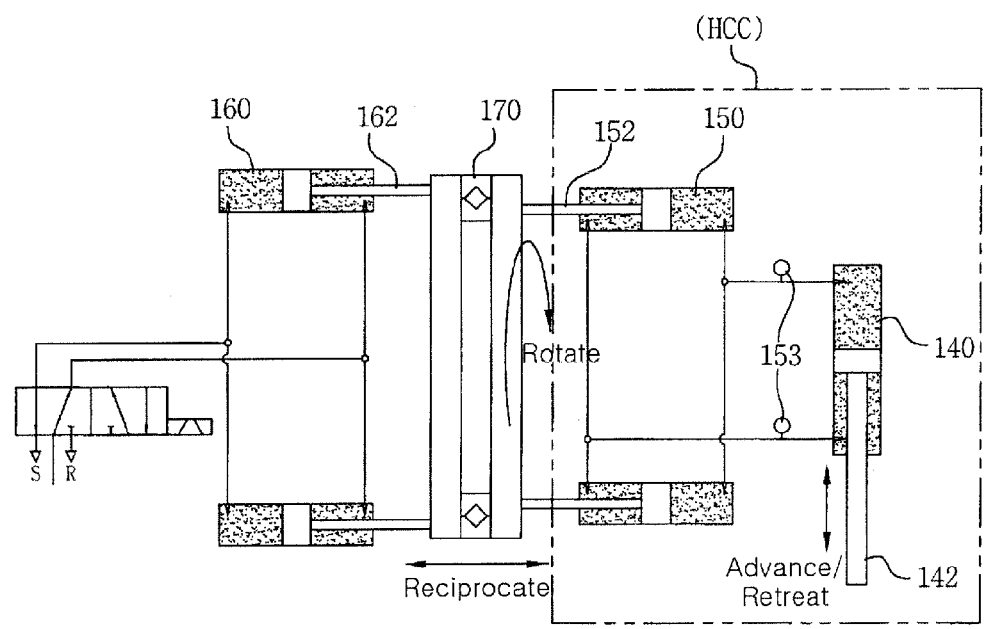

[Fig. 12]
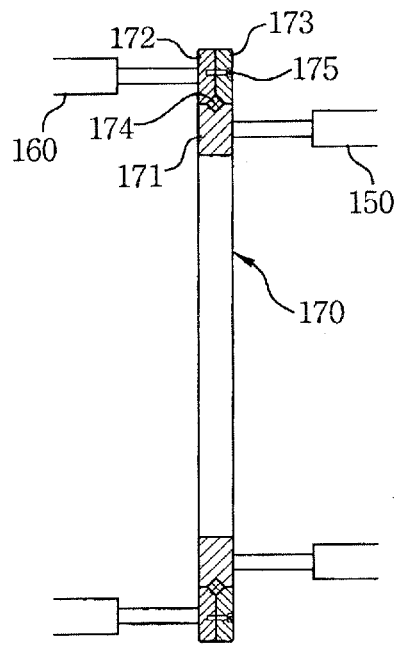
[Fig. 13]
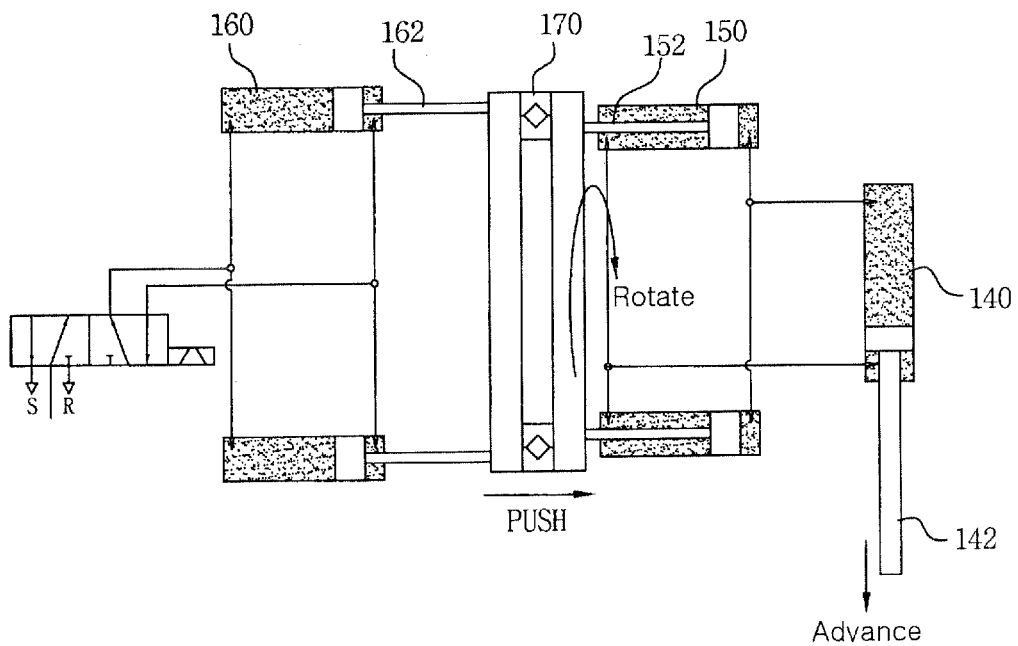

[Fig. 14]
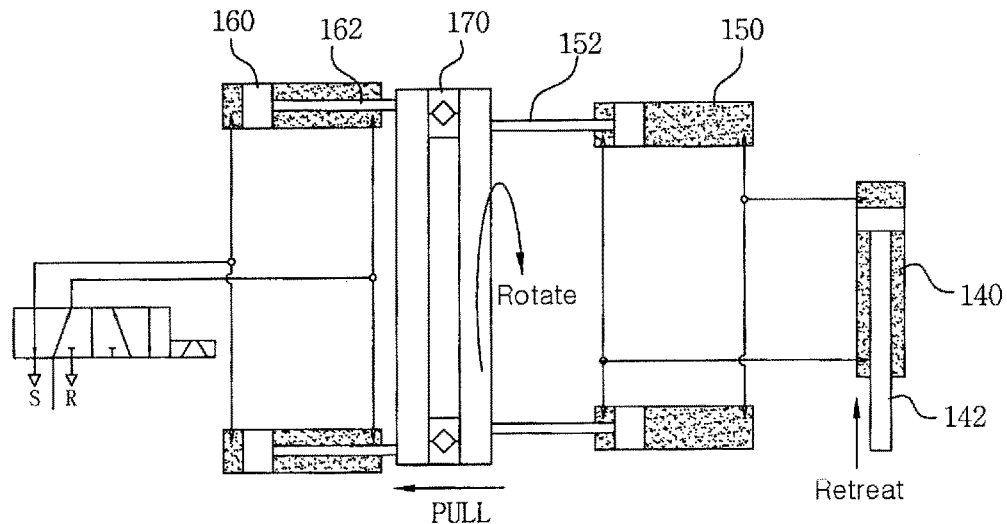
[Fig. 15]
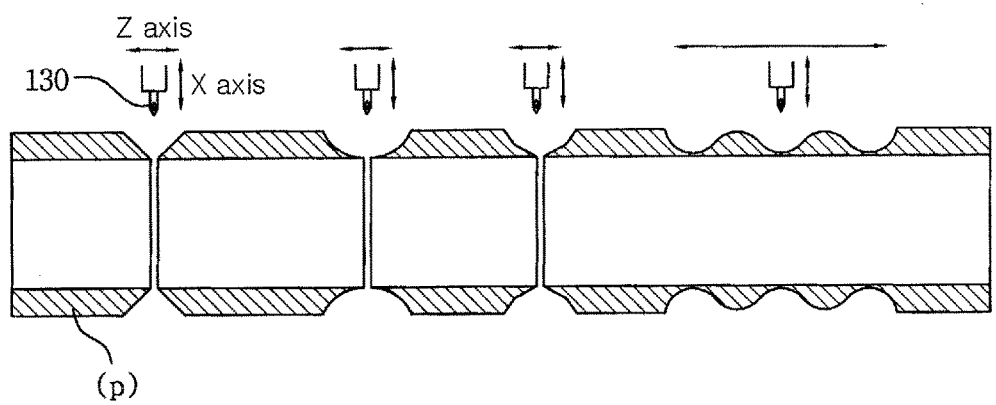
[Fig. 16]
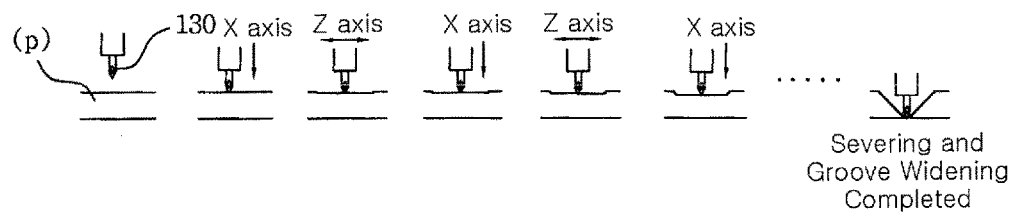

[Fig. 17]
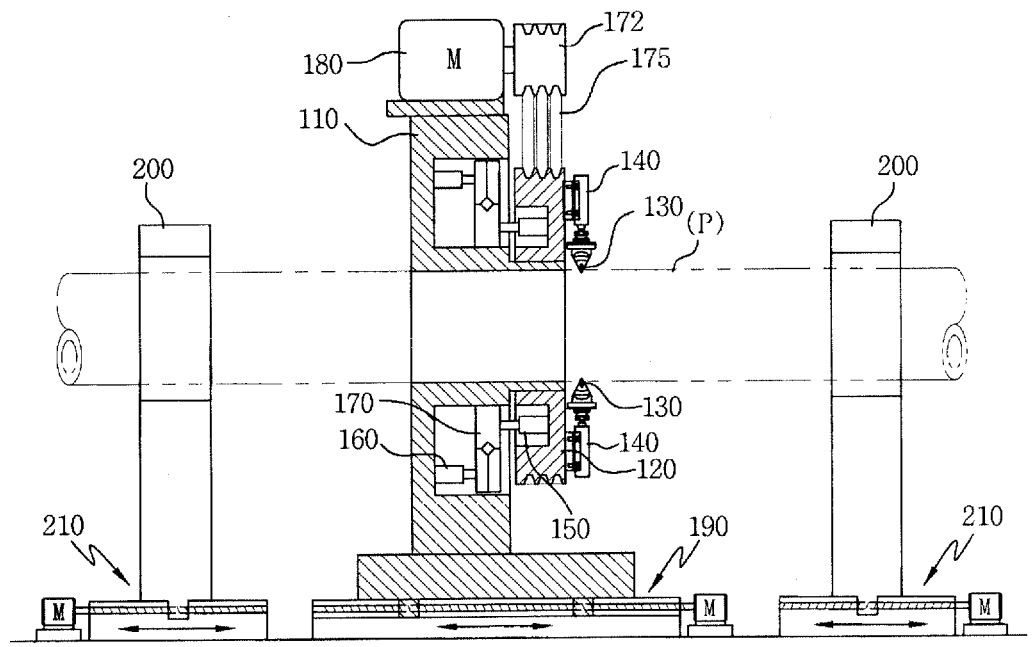
[Fig. 18]
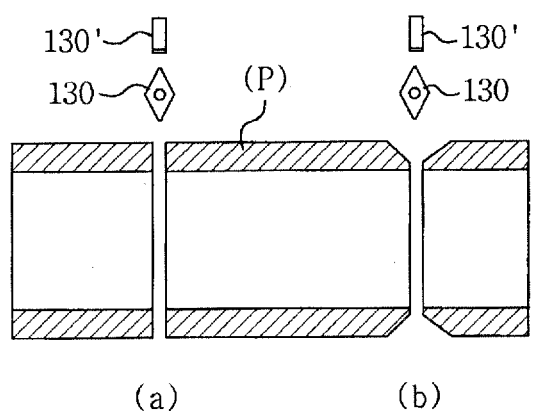
(a)　　　　　(b)

[Fig. 19]
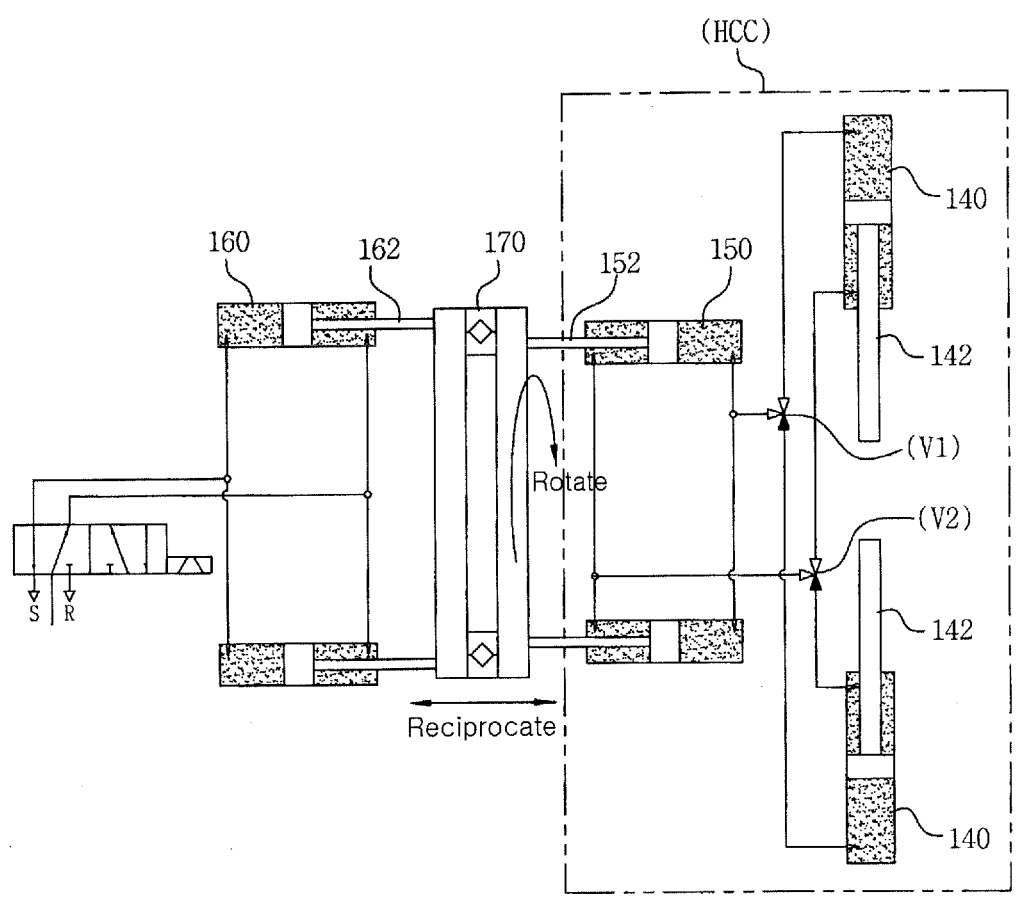

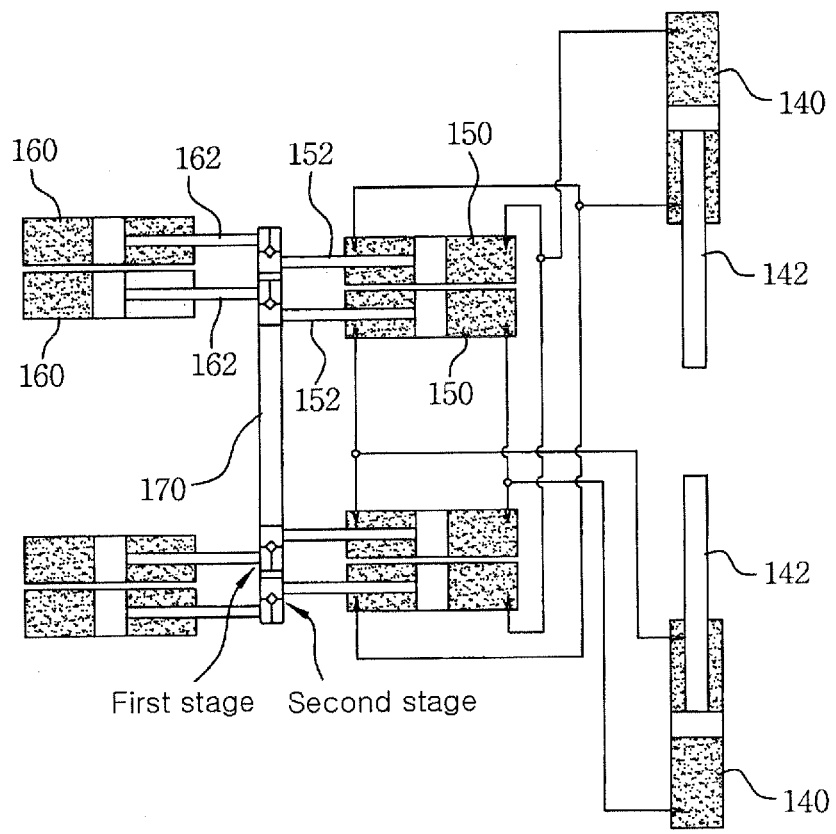
[Fig. 20]

[Fig. 21]
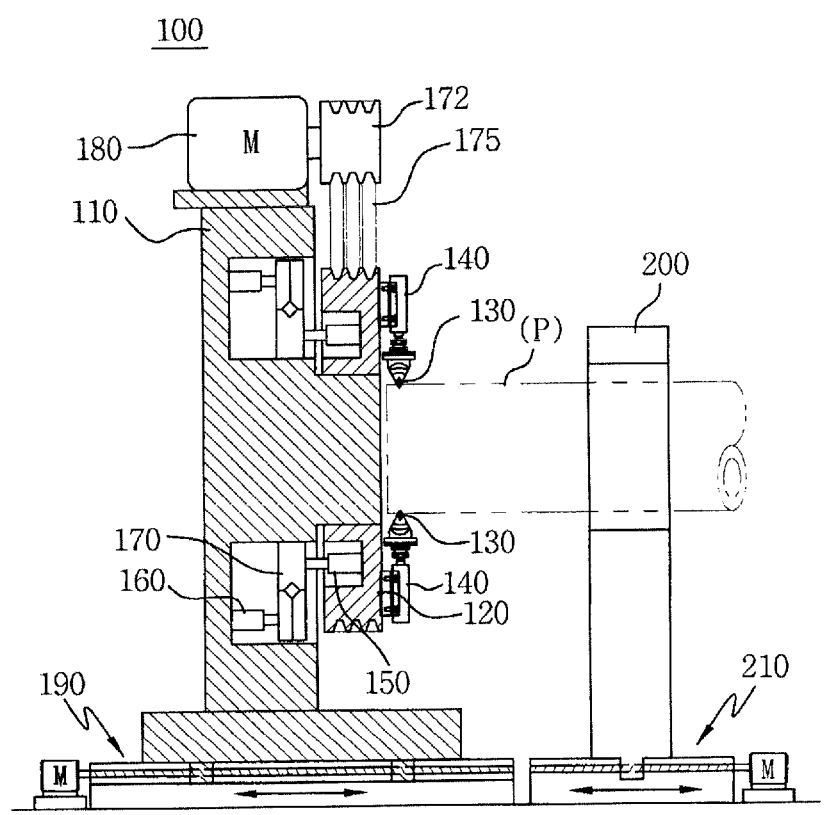

POWER TRANSFER DEVICE, ORBITAL PIPE CUTTING DEVICE AND HYDRAULIC CHUCKING DEVICE

CROSS-REFERENCE TO RELATED APPLICATIONS

This application represents the national stage entry of PCT International Application No. PCT/KR2015/002486 filed Mar. 13, 2015, which claims priority of Korean Patent Application No. 10-2014-0030771 2014 filed Mar. 17, 2014, and Korean Patent Application No. 10-2014-0045728 2014 filed Apr. 17, 2014, the disclosures of which are incorporated by reference here in their entirety for all purposes.

TECHNICAL FIELD

The present invention relates to a power transfer device for transferring external power to a rotary body, a pipe cutting device using the power transfer device and a hydraulic chucking device using the power transfer device. More particularly, the present invention pertains to a power transfer device which directly transfers external power into a rotary body rotating at a high speed with no influence of rotation such that the motion of a specific object existing within the rotary body can be freely controlled by the power, an orbital pipe cutting device capable of cutting a pipe, beveling a pipe or machining a pipe in different shapes through the use of the power transfer device, and a hydraulic chucking device.

BACKGROUND ART

In respect of a pipe cutting technique, an orbital pipe cutting device which performs a cutting operation by cutting a fixed pipe little by little at a specified depth while allowing a cutting tool to revolve around the outer periphery of the pipe has been developed along with the gradual increase in the size and weight of the pipe. The orbital pipe cutting device is equipped with both a cutting tool and a beveling tool so that the pipe cutting device can perform beveling as well as cutting As one example of the orbital cutting/beveling device mentioned above, there is available a device shown in FIGS. 1 and 2 (hereinafter referred to as prior art 1). As shown in FIGS. 1 and 2, the device of prior art 1 includes a main body 10 configured to place and fix a pipe (P) at the center thereof. A rotary body 20 configured to allow the pipe (P) to pass therethrough and rotated by an electric motor 15 is coupled to one side (the front side) of the main body 10. A cutting tool 31 and a beveling tool 32 are mounted to the front side of the rotary body 20 in an opposing relationship (or in a balanced manner). Each time when the rotary body 20 makes one revolution, the cutting tool 31 or the beveling tool 32 can make a vertical motion (toward the center of the pipe) by a predetermined distance. In this case, the cutting tool 31 and the beveling tool 32 are mounted to blocks 40 which are guided so that the blocks 40 can reciprocate toward and away from the center of the pipe (P) along the front surface of the rotary body 20. Each of the blocks 40 is threadedly coupled to a rotation shaft 50. A gear 51 is formed at the upper end of the rotation shaft 50. Each time when an engaging claw 60 protruding from the main body 10 makes contact with the gear 51, the rotation shaft vertically moves each of the blocks 40 at a pitch corresponding to the rotation angle of the gear 51, whereby the cutting tool 31 and the beveling tool 32 mounted to the blocks 40 can move toward the center of the pipe (P)

Prior art 1 is directed to the device in which, each time when the cutting tool 31 and the beveling tool 32 make one revolution around the pipe (P), the cutting tool 31 and the beveling tool 32 cut into the pipe (P) at a specified depth, thereby cutting or beveling the pipe (P). However, this is a limitative technique which cannot arbitrarily control the motion of the cutting tool and the beveling tool. In other words, the device of prior art 1 cannot arbitrarily control the cutting tool and the beveling tool while the rotary body 20 is being moved.

Since the cutting tool and the beveling tool cannot be arbitrarily controlled, it is impossible to change the cutting conditions depending on the size, material and kind of a workpiece. This may lead to a reduction in cutting efficiency. In some cases, it becomes impossible to perform a cutting operation. Moreover, in order to return the cutting tool and the beveling tool to the original positions after the cutting work is finished, the rotary body needs to be reversely rotated, or the work of returning the rotary body to the original position through the use of a separate reverse rotation means needs to be performed. This is cumbersome and onerous.

In the cutting/beveling device of prior art 1, it is difficult to predict the time at which the cutting tool or the beveling tool becomes dull or gets broken during the work. Thus, the burning of the workpiece is frequently generated due to the damage of the cutting tool or the beveling tool. More specifically, when the tool is dull or broken in the cutting/beveling device of prior art 1, the tool repeats an action of continuously moving toward the workpiece along with the rotation of the gear, even though the workpiece is not cut due to the abnormal tool conditions. As a result of repetition of this state, the load acting between the tool and the workpiece increases. This load may result in breakage of the tool as a whole or the workpiece.

In addition, the cutting/beveling device of prior art fails to solve the problem of inability to machine a workpiece in different shapes, the problem of inability to cut a thick pipe having a predetermined thickness or more, the problem of the gear and the engaging claw being broken due to the collision thereof, the problem of the cutting depth being difficult to control, and the problem of the beveling blade being frequently replaced depending on the beveling angle and shape.

The above problems will be described in more detail. The device of prior art 1 is configured to machine a pipe in the work order shown in FIG. 3. That is to say, the cutting tool 31 and the beveling tool 32 are moved into the pipe (P) as illustrated the first view of FIG. 3. If the cutting tool 31 and the beveling tool 32 are moved deeper, the pipe (P) is subjected to cutting and beveling at the same time in the order of the second to fourth views. Accordingly, the machining of the pipe performed by the device of prior art 1 is limited top plate 12 the cutting shown in FIG. 4A and the cutting and one-surface beveling shown in FIG. 4B.

As illustrated in FIG. 5, cutting can be performed only when the length of the cutting tool 31 for cutting the pipe is larger than the thickness (t) of the pipe to be cut. However, if the length (L) of the cutting tool is increased in order to cut a pipe having a thickness of several tens millimeters or more, the cutting tool cannot withstand the force applied during a cutting process and may be easily broken.

As can be seen in FIG. 6, the blade length ($l_b$) of the beveling tool 32 for beveling a cut surface of a pipe (P) may well be larger than the length of a slant surface of a pipe to be cut. However, as can be appreciated in FIG. 7, the blade length ($l_b$) of the beveling tool is significantly larger than the blade length (($l_c$) of the cutting tool. Thus, the blade of the beveling tool should bear the corresponding load.

The device of prior art 1 is configured to cut a pipe toward the center thereof by a predetermined depth value each time when the cutting tool makes one revolution. It can be noted that the load borne during a cutting process and the load borne during a beveling process, namely the cutting resistance force (P), acts in different ways. In this regard, the cutting resistance force (P) is determined by the specific cutting resistance (Ks), which depends on the material of a workpiece, the cutting width (l) and the machining depth (dp) and may be represented by the following mathematical formula:

$$P=Ks \times l \times dp$$

Therefore, as can be seen in FIG. 7B, when a cutting tip for performing a severing work is used, a pitch may be calculated by predicting the cutting width (l) and the machining depth (dp) while neglecting the specific cutting resistance which depends on the material of a workpiece. During a beveling work, as can be noted in FIG. 7A, the cutting width (l) varies depending on the thickness (t) of a pipe. It is therefore difficult to select a suitable pitch value for a beveling work (namely, a machining depth per one revolution). For that reason, it is impossible to satisfy different work requirements. This makes it difficult to commercialize the device of prior art 1. Thus, a hardship is encountered in designing a mechanism capable of overcoming the problem of frequent breakage of the beveling tool.

Each time when the gear caught by the engaging claw is rotated at a specified angle, the cutting tool and the beveling tool are moved down to cut a pipe at a specified depth. When one tries to cut and bevel a pipe having a thickness of several tens millimeters or more, there is posed a problem in that the gear, the parts thereof and the engaging claw may be broken due to the several hundreds of shocks generated by the collision of the gear and the engaging claw. For example, if it is assumed that the gear has five teeth, the pitch per one rotation of the gear is 1 mm and the thickness of the pipe is 20 mm, the engaging claw collides with the teeth of the gear five times while the pipe is cut by 1 mm. The engaging claw collides with the teeth of the gear one hundred times while the pipe is machined by 20 mm. If the cutting work is performed one hundred times per day, the collision will occur 10,000 times. If the cutting work is performed for one hundred days, the collision will occur 1,000,000 times. When the gear rotates at a high speed, the magnitude of shock grows larger, thereby adversely affecting the durability of the device.

In the device of prior art 1, cutting is performed only when the gear is caught by the engaging claw. It is therefore impossible to arbitrarily adjust the cutting depth. Thus, the range of choice of workpieces becomes narrow. That is to say, the cutting velocity and the cutting depth of a workpiece are determined depending on the material thereof or the kind of a tool used. In the prior art, there is a problem in that, even if such machining conditions exist, it is impossible to adjust the machining conditions.

The beveling angle of a pipe may vary depending on the kind and design of the pipe. The prior art has a disadvantage in that the beveling tool should necessarily be replaced in order to change the beveling angle.

In order to solve the aforementioned problem, technical studies have been conducted over a wide variety of fields. As a result, there has been developed a hydraulic control method which can easily transfer power, which can keep an input value and an output value substantially identical with each other and which is less susceptible to the centrifugal force of a rotary body.

As a related art of an orbital cutting device which hydraulically controls a cutting tool disposed within a rotary body, there is available a pipe severing device disclosed in Korean Utility Model Application Publication No. 1999-0012096 published on Apr. 6, 1999 (hereinafter referred to as prior art 2).

As shown in FIG. 8, prior art 2 is directed to a device which severs a round bar stock using the relative rotational movement between a round bar stock (P) which is a cut material and cutting tools (T1 and T2) which are cutting members. The device of prior art 2 includes: a cut material supply means (not shown) provided with a feed member for feeding a cut material by a predetermined length and a scroll chuck for firmly fixing the cut material; a cutting means provided with a cutting tool (T1) and a beveling tool (T2) and configured to be rotated at a high speed by a power transfer means so that the cutting means can cut a cut material while making relative rotation with respect to the cut material supply means; a power transfer means provided with a spindle drive pulley 74, a spindle 73 and a rotating plate 80 and configured to transfer rotational power to the cutting means; and an operation control means provided with a limit switch 90 and a plurality of hydraulic cylinders and beveling tool 32 control the operation of the cutting means. In the device of prior art 2, the cut material is kept stationary and the tools are relatively rotated to cut the cut material.

In the operation control means, a hydraulic fluid inlet port 72 is formed on a frame 71 installed in a fixing base 70. A pusher 75 disposed within the hydraulic fluid inlet port 72 is moved by the power of a hydraulic fluid supplied to the hydraulic fluid inlet port 72. The pusher 75 pushes two horizontal pushrods 81 disposed within the rotating plate 80 using a pusher flange 76 one-piece formed with the pusher 75. The pushrods 81 operate two vertical pistons 83 disposed within the rotating plate 80. By virtue of the operation of the vertical pistons 83, the cutting tool T1 and the beveling tool T2 are advanced and retreated in the direction perpendicular to the round bar stock P.

The limit switch 90 is connected to the pusher flange and is configured to detect the advanced state and retreated state of the pusher flange 76 for the utilization in automation.

Prior art 2 mentioned above has succeeded in allowing the external power to enter the rotary body. By detecting the application time of the external power, it is possible to realize automation of the device as a whole.

However, prior art 2 uses the external power only for the purpose of advance and automation of the cutting tool T1 and the beveling tool T2 and fails to use the external power in controlling the advance and retreat of the cutting tool T1 and the beveling tool T2. That is to say, the automation in prior art 2 is limited to an operation mode in which, after subjected to cutting and beveling, a round bar stock is moved into a machining position again. A problem is still posed in that it is impossible to accurately control the advance distance, the retreat distance and the re-advance of the tools.

Reviewing the detailed structure of prior art 2, the retreat of the cutting tool is performed by a spring 86 and the retreat of the pusher 75 is also performed by a spring 77. Accordingly, the cutting tool is not retreated by the external power but is retreated by the resilience force of the spring. This is mere return rather than control.

Furthermore, the vertical cylinder 83 and the pushrods 81 for moving the cutting tool are of a single-action type in which a hydraulic fluid flows into and out of a single port. This poses a problem in that the cutting tool is not rapidly advanced and retreated. More specifically, when the pressure is released in the hydraulic fluid inlet port 72 and the vertical cylinder 83 is moved upward by the resilience force of the spring 86, the hydraulic fluid flows through a single inlet/outlet port. Thus, the motion of the vertical cylinder 83 is slow. As a result, the advance and retreat of the cutting tool are not rapidly performed.

Prior art 2 is directed to a structure in which a roller 82 is used to rotatably connect the rotating pushrod 81 to the non-rotating push flange 76. In the structure employing the roller 82, the pushing force of the push flange 76 is transferred to the pushrod 81. However, the pulling force of the push flange 76 is not transferred to the pushrod 81. That is to say, even if the pressure is released from the hydraulic fluid inlet port 72 and the push flange 76 is retreated in order to control the retreat of the cutting tool, the pushrod 81 is slowly retreated by the resilience force of the spring 86 after the push flange 76 is moved away from the roller 82.

In view of the structural form of prior art 2 described above, there is a need to additionally innovate the structure of prior art 2 in order to accurately advance and retreat the cutting tool and to control the cutting tool in two or more axes so that the cross section of a round bar stock can be machined in many different shapes.

SUMMARY OF THE INVENTION

Technical Problem

The present invention has been conceived to solve the problem of inability to control the motion of a cutting tool within a rotary body among other problems inherent in the prior art. It is an object of the present invention to provide a power transfer device capable of directly transferring external power to the inside of a rotary body rotating at a high speed with no influence of rotation and capable of applying the power which can be used in freely controlling a specific object existing within the rotary body.

Another object of the present invention is to provide an orbital pipe cutting device capable of freely controlling the advance and retreat of a cutting tool moving within a rotary body through the use of the aforementioned power transfer device, capable of accurately controlling the advance and retreat of the cutting tool by allowing the advance and retreat of a pusher, which is induced by the external power generated in a fixed main body, to match with the advance and retreat of the cutting tool in a one-to-one matching relationship, capable of enabling the cutting tool to move not only in the direction perpendicular to a round stock as a cut material but also in the axial direction, capable of performing the cutting, the beveling and the machining of patterns having different shapes with a single cutting tool, and capable of simultaneously performing the cutting and the beveling of a pipe having a thickness of several tens millimeters or more or a heavy pipe.

A further object of the present invention is to provide a hydraulic chucking device capable of freely controlling the gripping forces of jaws moving within a rotary body through the use of the aforementioned power transfer device.

Technical Solution

In order to achieve the above objects, the present invention provides a power transfer device for transferring external power to a rotary body coupled to one side of a main body, including: at least one double-action interlocking cylinder mounted to a rear surface of the rotary body and provided with a rod protruding toward the main body; a push unit installed in the main body and provided with at least one pusher protruding toward the rotary body; and a bearing disposed between the pusher of the push unit and the rod of the interlocking cylinder and configured to allow relative rotation of the pusher and the rod and to transfer power between the pusher and the rod.

The power transfer device may further include: a double-action hydraulic cylinder installed on a front side of the rotary body and connected to the interlocking cylinder via a hydraulic closed circuit (HCC).

The present invention further provides an orbital pipe cutting device for freely controlling advance and retreat of a cutting tool, including: a main body; a rotary body coupled to one side of the main body and configured to allow a pipe to pass therethrough; a chuck installed on at least one of front and rear sides of the main body and configured to fix the pipe; the power transfer device of claim 2 installed in the main body and the rotary body; and a cutting tool mounted to a rod of the hydraulic cylinder and configured to reciprocate toward and away from a center of the rotary body (along an X-axis).

The orbital pipe cutting device may further include: a feed means installed in the main body and configured to enable the main body to reciprocate in an axial direction of the pipe (along a Z-axis).

The orbital pipe cutting device may further include: a chuck feed means installed in the chuck and configured to enable the chuck to reciprocate in an axial direction of the pipe (along a Z-axis).

The bearing may include an inner race, a pair of mutually-overlapping outer races configured to surround an outer periphery of the inner race, and a plurality of rollers inserted between the inner race and the outer races such that the axes thereof intersect with each other, each of the pusher of the push unit and the rod of the interlocking cylinder connected to the corresponding one of the inner race and the outer races.

The cutting tool may include a plurality of cutting tools, the hydraulic cylinder connected to the cutting tool may include a plurality of hydraulic cylinders, and a valve for operating one of the hydraulic cylinders may be installed on a line which interconnects the hydraulic cylinders and the interlocking cylinder.

The bearing may be formed so as to have multiple stages, and a set of the pusher, the interlocking cylinder, the hydraulic cylinder and the cutting tool may be connected to each of the multiple stages of the bearing such that a plurality of cutting tools is independently controlled.

The present invention further provides an orbital pipe cutting device for freely controlling advance and retreat of a cutting tool, including: a main body; a rotary body coupled to one side of the main body and configured to make rotation; the power transfer device of claim 2 installed in the main body and the rotary body; a cutting tool mounted to a rod of the hydraulic cylinder and configured to reciprocate toward and away from a center of the rotary body (along an X-axis); and a chuck installed on a front side of the main body and configured to fix a pipe such that an end portion of the pipe is placed within a machining range of the cutting tool.

The present invention further provides a hydraulic chucking device, including: a rotary body coupled to one side of a main body and configured to allow a chucking target workpiece to pass therethrough; a plurality of double-action hydraulic cylinders mounted on a front side of the rotary body so as to reciprocate toward and away from the workpiece (along an x-axis) and configured to press the workpiece; a plurality of jaws mounted to the hydraulic cylinders and configured to chuck the workpiece; at least one double-action interlocking cylinder mounted on a rear surface of the rotary body and provided a rod protruding toward the main body, the interlocking cylinder connected to the hydraulic cylinders via a hydraulic closed circuit (HCC); a push unit installed in the main body and provided with at least one pusher protruding toward the rotary body; and a bearing disposed between the pusher of the push unit and the rod of the interlocking cylinder and configured to allow relative rotation of the pusher and the rod and to transfer power between the pusher and the rod.

Advantageous Effects

The power transfer device according to the present invention has the advantage in that, when a specific object makes movement other than rotation within a rotary body rotating at a high speed, the moving object can be moved in a desired direction by the external control, and in that the power transfer device can be utilized in a rotation device such as a cutting device or a chucking device.

The orbital pipe cutting device according to the present invention has the advantage in that the arbitrarily uncontrollable cutting depth is not determined depending on the collision frequency of a gear and an engaging claw as in the prior art, and in that the cutting tool can be freely moved by the external power, the durability of the device can be secured and the cutting conditions can be arbitrarily determined depending on the kind and material of a pipe.

The orbital pipe cutting device according to the present invention has the advantage in that at least one cutting tool can move in the pipe center direction (the X-axis direction) and the longitudinal direction (the Z-axis direction) of a pipe while revolving around the pipe, which enables the severing of the pipe, the simultaneous severing and beveling, the surface cutting and the machining of a pattern having a special shape.

The orbital pipe cutting device according to the present invention has the advantage in that, even a heavy pipe or a pipe having a thickness of several to several tens millimeters is simultaneously severed and beveled, a single cutting tool can machine the pipe in a V shape, a U shape or a double-cut shape while moving downward, and in that, if the thickness of the pipe falls within a range over which the cutting tool can move downward, the pipe can be cut in different shapes at a high speed by a single tool.

The orbital pipe cutting device according to the present invention has the advantage in that the use of a standardized cutting tool is more economical in terms of maintenance than the use of a high-priced beveling tool which is used in the prior art to cut a relatively wide surface at one time, and in that the beveling range can be freely set without having to replace the beveling tool depending on the beveling angle as in the prior art.

BRIEF DESCRIPTION OF THE DRAWINGS

FIG. 1 is a front view showing a pipe cutting and beveling machine according to prior art 1.

FIG. 2 is a side view showing the pipe cutting and beveling machine according to prior art 1.

FIG. 3 is a view sequentially illustrating a work process of simultaneously performing cutting and beveling in the pipe cutting and beveling machine according to prior art 1.

FIGS. 4A and 4B are views illustrating some machining examples which may be performed by the pipe cutting and beveling machine according to prior art 1.

FIG. 5 is a view showing the relationship between the cutting tool length and the pipe thickness in the pipe cutting and beveling machine according to prior art 1.

FIG. 6 is a view showing the relationship between the beveling tool length and the pipe thickness in the pipe cutting and beveling machine according to prior art 1.

FIGS. 7A and 7B are views showing the relationship of the forces borne by the beveling tool shown in FIG. 6 during a cutting process.

FIG. 8 is a view showing a pipe cutting machine according to prior art 2.

FIG. 9 is a view showing the configuration of an orbital pipe cutting device according to an embodiment of the present invention.

FIG. 10 is a view showing an orbital pipe cutting device according to another embodiment of the present invention.

FIG. 11 is a diagram showing hydraulic lines for operating a cutting tool according to the present invention.

FIG. 12 is a view showing, in more detail, the bearing shown in FIG. 11.

FIG. 13 is a hydraulic line diagram showing the state in which the cutting tool is advanced.

FIG. 14 is a hydraulic line diagram showing the state in which the cutting tool is retreated.

FIG. 15 is a view illustrating different machining examples which may be performed by the orbital pipe cutting device according to the present invention.

FIG. 16 is a view illustrating the machining order in which the cutting work and the double-cut forming work are simultaneously performed according to the first machining example among the machining examples shown in FIG. 15.

FIG. 17 is a view showing an orbital pipe cutting device according to the present invention, which includes a plurality of cutting tools.

FIG. 18 is a view for explaining the reason why a plurality of cutting tools is needed.

FIG. 19 is a diagram showing hydraulic lines which are employed when a plurality of cutting tools is used.

FIG. 20 is a diagram showing hydraulic lines which are employed when a plurality of cutting tools is independently controlled.

FIG. 21 is a view showing an orbital pipe cutting device according to a further embodiment of the present invention, which is dedicated to machining an end portion of a pipe.

BEST MODE FOR CARRYING OUT THE INVENTION

A power transfer device for transferring external power to the inside of a rotary body, an orbital pipe cutting device capable of freely controlling the motion of a cutting tool within a rotary body using the power transfer device and a hydraulic chucking device using the power transfer device according to preferred embodiments of the present invention will now be described with reference to the accompanying drawings. The power transfer device is equivalent to the drive principle of the orbital pipe cutting device and, therefore, will be additionally described while describing the embodiments of the orbital pipe cutting device.

FIG. 9 is a view showing the overall configuration of an orbital pipe cutting device according to an embodiment of the present invention. As shown in FIG. 9, the orbital pipe cutting device 100 according to the present invention includes a main body 110, a rotary body 120 configured to rotate on one surface of the main body 110, and a cutting tool 130 mounted to the front surface of the rotary body 120 so as to reciprocate toward and away from the center of the rotary body 120 and configured to cut a pipe (P) extending through the main body 110 and the rotary body 120 in a desired shape.

The term "pipe (P)" used herein refers to an elongated pipe shown in the drawings or a bar which may have a circular shape or a square shape. The pipe (P) is not necessarily limited to a linearly elongated pipe but may be a curved pipe such as an elbow or the like or any object that can be placed on the axis of the main body 110.

The main body 110 has an erected shape such as an L shape or the like and preferably has a horizontal wide shape so that the main body 110 serves as a base for supporting the components of the cutting device 100. The main body 110 is not limited to one having a specific shape.

The main body 110 is installed on a ground surface or a bed. In some cases, the main body 110 may reciprocate in the Z-axis direction. The Z-axis direction refers to the longitudinal direction (or the axial direction) of the pipe (P). The main body 110 may be used to fast feed the cutting tool 130 to a position where the pipe (P) is cut. In addition, the main body 110 may be used to finely feed the cutting tool 130 for the machining purpose. Thus, a moving means such as a linear motion guide or a ball screw may be installed below the main body 110 so that the main body 110 can be selectively moved in the Z-axis direction. The pipe (P) horizontally passes through the intermediate portion of the main body 110. Thus, the hub 112 of the main body 110 may preferably be kept horizontal and the main body 110 may preferably be installed upright.

In the main body 110, there are needed chucks 200 for immovably fixing the pipe (P) extending through the main body 110. The chucks 200 may be installed outside the main body 110 as shown in FIG. 9 or may be installed within the main body 110 or on the bed. Only one of the chucks 200 may be installed on one side of the main body 110. In the case where the pipe (P) is heavy and long, two chucks 200 may preferably be installed on the front and rear sides of the main body 110.

As can be seen in FIG. 10, the chucks 200 may be one-piece installed so as to support the main body 110. More specifically, the chucks 200 may be installed on the opposite side of the main body 110. Then, guide shafts 182 may be installed in the upper and lower portions of the chucks 200 so that the main body 110 can be supported by the guide shafts 182. The main body 110 may be moved to the left and right sides along the guide shafts 182. A feed means 190 may be installed below the chucks 200 and may be connected to the main body 110 so that the main body 110 can be automatically moved by controlling the feed means 190.

The rotary body 120 is rotatably mounted to one surface of the main body 110. The hub 112 of the main body 110 has a protruding portion. The rotary body 120 is rotatably fitted to the outer surface of the protruding portion of the hub 112 through a bearing. An electric drive unit 180 for rotating the rotary body 120 is installed in the main body 110. The electric drive unit 180 is connected to the rotary body 120 via belts. The rotary body 120 is rotated at a suitable revolution number by the torque of the electric drive unit 180. That is to say, the rotary body 120 is fitted such that the rotary body 120 can rotate about the pipe (P) to be machined without departing from the main body 110.

The rotary body 120 is rotated to machine the pipe. It is therefore preferred that the rotary body 120 has a non-eccentric circular plate shape so that the rotary body 120 can make smooth rotation. Pulleys for receiving power from the electric drive unit 180 are formed on the outer circumferential surface of the rotary body 120. In the present embodiment, the electric drive unit 180 and the rotary body 120 are operatively connected by the belts. However, the electric drive unit 180 and the rotary body 120 may be operatively connected by gears or chains. In the case of operatively connecting the electric drive unit 180 and the rotary body 120 with the gears, a difficulty may be involved in forming a gear on the outer circumferential surface of the rotary body 120 having a large diameter. However, the use of the gears has an advantage in that the gears can accurately transfer power. The use of the belts may be advantageous in terms the manufacture and the machining.

Next, a description will be made on a control structure by which the cutting tool 130 is advanced or retreated toward or away from the pipe (P) by the external power within the rotary body 120 rotating at a high speed.

The cutting tool 130 according to the present invention is mounted to a rod of a hydraulic cylinder 140 fixedly secured to the rotary body 120 so that the cutting tool 130 can be selectively advanced and retreated. More specifically, the hydraulic cylinder 140 is fixedly secured to the rotary body 120 and the cutting tool 130 is attached to one end of the rod of the hydraulic cylinder 140. In order to obtain a precise feed value, the cutting tool 130 is not directly connected to the rod but may preferably be connected to the rod via a guide member such as a guide block or the like.

Since the rotary body 120 of the cutting device 100 according to the present invention is rotated at a high speed by the electric drive unit 180, a large difficulty may be involved in supplying and recovering a hydraulic fluid to and from the hydraulic cylinder 140. The hydraulic fluid needs to be supplied at a high pressure through a sealed tube. A high-pressure hydraulic line is hard to pass through the rotary body 120 rotating at a high speed. Thus, in the present invention, a hydraulic closed circuit (HCC) is installed on the rotary body 120 rotating at a high speed. A push unit 160 is installed so as to push and pull the hydraulic closed circuit. In order to install the push unit 160 and the hydraulic closed circuit, a space is defined between the main body 110 and the rotary body 120. This space may be formed by installing the rotary body 120 such that the rotary body 120 is spaced apart from the main body 110 a predetermined distance, or by cutting away the inner portions of the main body 110 and the rotary body 120 which face each other.

FIG. 11 is a diagram showing hydraulic lines for operating the cutting tool. FIG. 12 is a view showing, in more detail, the bearing shown in FIG. 11.

Referring to FIGS. 9 and 11, the hydraulic closed circuit (HCC) includes an interlocking cylinder 150 mounted on the rear surface of the rotary body 120 and connected to the hydraulic cylinder 140. More specifically, the interlocking cylinder 150 is installed such that the rod thereof protrudes toward the main body 110. If the rod 152 of the interlocking cylinder 150 is retracted, the rod 142 of the hydraulic cylinder 140 is extended. If the rod 152 of the interlocking cylinder 150 is extended, the rod 142 of the hydraulic cylinder 140 is retracted. In order to maintain the mutually opposite movement of the hydraulic cylinder 140 and the interlocking cylinder 150, the hydraulic pressure in the hydraulic closed circuit (HCC) is set such that the internal pressure is kept constant on the side of the hydraulic cylinder 140 and on the side of the interlocking cylinder 150.

Furthermore, in order to check the current hydraulic pressure within the hydraulic closed circuit (HCC) and to supplement a pressure when the hydraulic pressure is not sufficiently high, there may be installed a pressure gauge, a filling port 153 and a unit for notifying an abnormal state.

More specifically, one hydraulic cylinder 140 is installed on the front side of the rotary body 120 so as to move one cutting tool 130. At least one interlocking cylinder 150 connected to the hydraulic cylinder 140 via the hydraulic closed circuit is installed. In this case, the hydraulic cylinder 140 is well operated even if there is installed only one interlocking cylinder 150. However, for the purpose of preventing the rotary body 120 from being eccentrically rotated by one interlocking cylinder 150, it is preferred that a plurality of interlocking cylinders is installed at regular intervals. Moreover, the hydraulic cylinder 140 may have a large capacity in order to apply a large enough force to the cutting tool 130. However, in view of the restriction in the space between the rotary body 120 and the main body 110 and the restriction in the eccentricity-incurring weight, it is preferred that a plurality of interlocking cylinders 150 is installed and connected to one hydraulic cylinder 140. The total volume of the plurality of interlocking cylinders 150 needs to be designed so as to correspond to the volume of one hydraulic cylinder 140.

Double-action cylinders are used as the hydraulic cylinder 140 and the interlocking cylinder 150 in order to assure rapid advance and retreat of the cutting tool 130. In the case of considering only the advance of the cutting tool as in prior art 1, it may be possible to use a single-action cylinder. In the present invention, there is a need to accurately control the advance distance, the retreat distance, the re-advance distance and the re-retreat distance. Thus, the rapid advance and retreat of the cutting tool 130 are essential conditions in the present invention. For that reason, double-action cylinders having a push-pull function are used as the hydraulic cylinder 140 and the interlocking cylinder 150.

The push unit 160 is installed on the front surface of the main body 110 which faces the interlocking cylinder 150. The push unit 160 includes a pusher 162 which makes contact with the end portion of the rod 152 of the interlocking cylinder 150. The pusher 162 is formed of a cylinder rod. The push unit 160 may be implemented by a hydraulic cylinder. The push unit 160 may be a pneumatic cylinder, an electric cylinder, a linear motor, a ball screw or other units capable of making a reciprocating motion. The push unit 160 supplies original external power for controlling the movement of the cutting tool 130 within the rotary body 120. Although the push unit 160 may be automatically controlled, various kinds of handles or levers for manual control may be mounted to the push unit 160.

The pusher 162 of the push unit 160 generates specific exhaust power. The pusher 162 is configured such that the end portion thereof makes contact with the rod 152 of the interlocking cylinder 150. In this case, the rotary body 120 is rotated at a high speed. The interlocking cylinder 150 and the rod 152 connected to the rotary body 120 are rotated together with the rotary body 120. Friction is generated by the pusher 162 which makes contact with the rod 152 of the interlocking cylinder 150. Although the pusher 162 applies a pushing force against the interlocking cylinder 150, the pulling force as in prior art 2 is not applied to the interlocking cylinder 150.

Accordingly, in the present invention, a bearing 170 is retained between the interlocking cylinder 150 and the pusher 162. A bearing (or a like mechanical part) capable of transferring a load in the axial opposite directions while permitting free rotation of the shafts (or the rods), may be used as the bearing 170.

The bearing 170 according to the present invention is formed in a large ring shape and is configured to surround the hub 112 of the main body 110. In this case, the interlocking cylinder 150 and the pusher 162 may preferably be provided in a plural number. Since one interlocking cylinder 150 and one pusher 162 are incapable of pushing or pulling the bearing 170 in a non-inclined manner, it is preferred that a plurality of interlocking cylinders and a plurality of pushers are disposed at regular intervals.

Next, a description will be made on the bearing 170 employed in the present invention.

As mentioned above, the bearing 170 employed in the present invention is designed to receive a rotational load and an axial load. For that reason, as shown in FIG. 12, the bearing 170 includes one inner race 171, two outer races 172 and 173 surrounding the outer periphery of the inner race 171, and rollers 174 inserted between the inner race 171 and the outer races 172 and 173. In this case, the rollers 174 are alternately inserted in such a way that the rotation axes thereof intersect each other. V-grooves for receiving the rollers 174 are formed on the surfaces of the inner race 171 and the outer races 172 and 173. The outer races 172 and 173 of the bearing 170 thus disposed are firmly coupled together by fastening bolts 175. The push unit 160 is fixed to one outer race 172 and the interlocking cylinder 150 is fixed to the inner race 171. The bearing 170 may not be horizontally moved only by the push-pull force of the pusher 162. A plurality of posts and guide bushes extending from the main body 110 or the rotary body 120 may be inserted through the inner race 171 or the outer races 172 and 173 so that the movement of the bearing 170 can be horizontally and accurately transferred.

The cutting tool control structure described above constitutes the power transfer device according to the present invention. In order to transfer the external power to the rotary body 120, the interlocking cylinder 150 is mounted to the rotary body 120. The bearing 170 which performs a rotating action and a load transfer action is mounted to the rod 152 of the interlocking cylinder 150. The pusher 162 is mounted to the bearing 170 at the opposite side of the rod 152. The pusher 162 is operated by the push unit 160 formed of an automatic or manual linear reciprocating means such as a hydraulic, pneumatic or electric cylinder, a linear motor, a ball screw, or gears. As the pusher 162 makes push-pull reciprocating movement, the force is transferred to the rotating interlocking cylinder 150 through the bearing 170.

In this way, the input or output (or the flow rate and the pressure) of the hydraulic fluid generated by the retraction and extension of the rod 152 may be used as the force transferred to the interlocking cylinder 150. The interlocking cylinder 150 may be a dual rod type cylinder. In this case, one of the rods serves to receive the external power while the other rod serves to output the input power.

More specifically, when the interlocking cylinder 150 is retracted and extended, the hydraulic fluid existing therein flows into and out of the interlocking cylinder 150. The movement of the hydraulic fluid is connected to the cutting device 100 and the hydraulic cylinder 140 by the hydraulic closed circuit (HCC) so that a specific object can be controlled by the hydraulic force. During the retraction and extension of the dual rod type interlocking cylinder 150, the opposite rod moving in the opposite direction may be used as a means for moving a specific object existing within the rotary body 120. As an example, it is possible to provide a force required in a linear motion such as an on/off operation of a switch, an operation of a stopper or a push-pull operation.

Next, a description will be made on the operation of advancing or retreating the cutting tool 130 toward or away from the pipe (P) through the use of the push unit 160 and the hydraulic closed circuit (HCC).

FIG. 13 is a view showing the advanced state of the cutting tool. As shown in FIG. 13, if the hydraulic fluid is supplied from a pump to the push unit 160 in response to a signal so that the pusher 162 of the push unit 160 is extended, the pusher 162 pushes the bearing 170 toward the rotary body 120. The interlocking cylinder 150 is retracted by the pushing action. Although a hydraulic cylinder is used as the push unit 160, the push unit 160 may be any automatic or manual reciprocating means other than the hydraulic cylinder.

If the interlocking cylinder 150 is retracted in this way, the hydraulic cylinder 140 connected to the interlocking cylinder 150 is extended in the opposite direction, whereby the cutting tool 130 is advanced toward the pipe (P). This action is performed by only the movement of the hydraulic fluid while maintaining the equilibrium of the hydraulic pressure within the hydraulic closed circuit (HCC) formed of the interlocking cylinder 150 and the hydraulic cylinder 140. The bearing 170 serves to as a bridge which interconnects the hydraulic closed circuit (HCC) and the pusher 162. Even if one part (the hydraulic closed circuit) is rotated, the rotation does not affect the other part (the pusher). Thus, the push load is transferred even though one part is rotated.

FIG. 14 is a view showing the retreated state of the cutting tool. As shown in FIG. 14, if the hydraulic fluid is supplied from the pump to the push unit 160 in response to a signal so that the pusher 162 is retracted, the pusher 162 pulls the bearing 170 at the side of the main body 110. The interlocking cylinder 150 is extended by the pulling action.

If the interlocking cylinder 150 is extended, the hydraulic cylinder 140 connected to the interlocking cylinder 150 is retracted. Thus, the rod 142 of the hydraulic cylinder 140 pulls the cutting tool 130 so that the cutting tool 130 can be retreated away from the pipe (P). This action is performed by only the movement of the hydraulic fluid while maintaining the equilibrium of the hydraulic pressure within the hydraulic closed circuit (HCC) formed of the interlocking cylinder 150 and the hydraulic cylinder 140. The bearing 170 serves to as a bridge which interconnects the hydraulic closed circuit (HCC) and the pusher 162. Thus, the axial load is transferred while the hydraulic closed circuit (HCC) and the pusher 162 is freely rotating with respect to each other.

As shown in FIG. 9, the orbital pipe cutting device 100 according to the present invention includes a feed means 190 disposed below the main body 110 so as to move in the Z-axis direction. This enables the cutting tool 130 to make substantially two-axis (X-axis and Z-axis) movement. More specifically, the cutting tool 130 mounted to the rotary body 120 moves in the X-axis direction while advancing and retreating within the rotary body 120. If the main body 110 to which the rotary body 120 is mounted is moved in the Z-axis direction by the feed means 190, the cutting tool 130 makes two-axis movement in the X-axis and Z-axis directions with respect to the pipe (P).

For the purpose of this two-axis movement, the pipe (P) needs to be fixed by a restraint means other than the main body 110. Thus, the chucks 200 are installed on the front and rear sides of the main body 110 or on one of the front and rear sides of the main body 110. A chuck feed means 210 like the feed means 190 of the main body 110 may be installed below each of the chucks 200.

The reason for enabling the orbital pipe cutting device 100 to perform two-axis machining is to machine the pipe (P) in different shapes. Different weld grooves defined in the specifications need to be machined on the pipe (P) depending the material and thickness of a pipe.

More specifically, in the heavy-pipe-related industry, it is required that a weld groove be formed in a I shape, a V shape, a U shape or a double-cut shape as shown in Table 1 below. That is to say, an I-shaped weld groove is used primarily when welding a pipe having a thickness of 3 mm or less. In this case, stable welding can be performed without having to widen the groove. However, if the thickness of a pipe grows larger, it is necessary to perform a work of widening a groove. If the thickness of a pipe is 20 mm or less, it is possible to use a V-shaped weld groove. However, if the thickness of a pipe is larger than 20 mm, there is a need to use a U-shaped weld groove or a double-cut weld groove.

TABLE 1

<Examples of the cross-sectional shape of a weld groove depending on the thickness of a pipe>

| Weld groove shape | Cross-sectional shape of Weld Groove | Pipe Thickness |
| --- | --- | --- |
| I shape | | t < 3 mm |
| V shape | | t = 6 to 19 mm |
| U shape | | t > 20 mm |
| Double-cut shape | | t > 40 mm |

The cutting devices of the prior art and other cutting/beveling devices fail to comply with the weld groove widening requirements. Thus, it is the current situation that the weld groove widening work is manually performed through the use of a grinder.

However, the orbital pipe cutting device 100 according to the present invention can machine any type of weld groove required in a groove welding work. This assists in automating a factory.

FIG. 15 is a view illustrating different machining examples which may be performed by the orbital pipe cutting device according to the present invention. As can be seen in the first machining example shown in FIG. 15, a groove widening work may be performed on the severed surface in an oblique direction simultaneously with the severing of a pipe (V-shaped weld groove machining). As can be noted in the second machining example, a grove widening work may be performed in a round shape simultaneously with the severing of a pipe (U-shaped weld groove machining). As can be appreciated in the third machining example, a double-cut weld groove may be machined. As can be seen in the fourth machining example, the pipe may be machined to form successive round grooves.

As one example of the machining method using the orbital pipe cutting device 100 according to the present invention, a machining method capable of performing a groove widening work in an oblique direction simultaneously with the severing of a pipe will be described with reference to FIG. 16.

As shown in FIG. 16, the cutting tool 130 is positioned in a target machining region of a pipe (P). When positioning the cutting tool 130 in the target machining region, it may be possible to selectively use one of a method of setting a machining position by operating the feed means 190 of the main body 110 and a method of setting a machining position by operating the chuck feed means 210.

After the machining position is set in the aforementioned manner, the rotary body 120 is rotated about the C-axis. In this state, the cutting tool 130 is moved in the X-axis direction so as to advance toward the surface of the pipe. At this time, suitable cutting conditions are set depending on the kind and thickness of the pipe.

Then, the pipe is machined by feeding the main body 110 in the Z-axis direction. In this case, the movement distance of the main body 110 in the Z-axis direction can be easily calculated based on the thickness (t) of the pipe (P) and the groove widening angle (°). A desired severing and beveling work can be completed by repeating the X-axis direction machining and the Z-axis direction machining several to several ten times.

In the cutting device 100 according to the present invention, as shown in FIG. 16, the cutting tool 130 is configured to advance from the wide outer surface toward the gradually narrowing inner side when simultaneously performing the severing work and the groove widening work. For that reason, it is not necessary for the cutting tool to have a length corresponding to the thickness of a pipe as is the case in prior art 1. That is to say, in the cutting device 100 according to the present invention, the X-axis direction movement distance of the cutting tool 130 is a factor that determines the thickness of a thickness. In the cutting device 100 according to the present invention, the rotary body 120 may be rotated at a high speed. Therefore, even if the machining order is complex, it is possible to finish the machining work within a short period of time.

FIG. 17 is a view showing an orbital pipe cutting device according to the present invention, which includes two cutting tools. FIG. 18 is a view for explaining the reason why a plurality of cutting tools is needed. FIG. 19 is a diagram showing hydraulic lines for controlling two cutting tools.

As shown in FIG. 17, the orbital pipe cutting device 100 according to the present invention may include a plurality of cutting tools 130 mounted to the rotary body 120. The reason for employing a plurality of cutting tools 130 in this way is to enable the respective cutting tools 130 to be used for different works, for example, in such a way that one of the cutting tools performs a severing work while the other performs a beveling work. For example, as shown in FIG. 18, the cutting tool 130 for a two X-axis and Y-axis machining work is unsuitable for a vertical severing work. Thus, a finishing work may not be performed unless cutting tool 130 is replaced by a tool for a vertical severing work. In order to successively perform machining works, two hydraulic cylinders 140 are installed such that different cutting tools 130 and 130 can be mounted to the respective hydraulic cylinders 140.

In order to control the plurality of cutting tools 130 and 130, as shown in FIG. 19, three-way valves V1 and V2 are installed on the lines extending from the interlocking cylinders 150 to the hydraulic cylinders 140. By controlling the three-way valves V1 and V2, it is possible to selectively operate the cutting tools 130 and 130. It may be possible to employ three or more cutting tools 130 and three or more hydraulic cylinders 140. In this case, there is a need to change the valves V1 and V2 for selectively operating the respective hydraulic cylinders 140. Although the valves V1 and V2 exist within the rotary body 120, the operation mode of the valves V1 and V2 can be switched by touching the valves V1 and V2 through a simple manipulation, for example, by pushing a protruding lever into the rotary body 120 from the outside of the main body 110.

While there has been illustrated the embodiment in which only one of the cutting tools 130 and 130 is selectively operated by the valves V1 and V2, it may be possible to independently and simultaneously control a plurality of cutting tools. More specifically, as shown in FIG. 20, the pusher 162, the bearing 170, the interlocking cylinder 150, the hydraulic cylinder 140 and the cutting tool 130 may be formed into one set. There may be provided another set of a pusher, a bearing, an interlocking cylinder, a hydraulic cylinder and a cutting tool. In this case, sufficient spaces for accommodating the pushers and the cylinders exist on the side of the main body and on the side of the rotary body. However, there is a limit in the operation of the bearing 170. For that reason, bearings 170 are installed in double stages or multiple stages. The inner first stage of the bearings 170 is connected to the first set of the pusher and the interlocking cylinder while the outer second stage of the bearings 170 is connected to the second set of the pusher and the interlocking cylinder. This makes it possible to simultaneously control a plurality of cutting tools. Alternatively, every two of four cutting tools may be operated in a pair by installed a valve on a hydraulic line connected to each pair of the cutting tools.

The orbital pipe cutting device 100 according to the present invention is not only capable of alternately controlling the plurality of cutting tools 130 but also capable of simultaneously controlling the plurality of cutting tools 130.

FIG. 21 is a view showing an orbital pipe cutting device according to a further embodiment of the present invention. As shown in FIG. 21, the central portion of the main body 110 may not be penetrated. When machining a pipe, the intermediate portion of the pipe is not necessarily sever or beveled. The orbital pipe cutting device 100 according to the present invention may be dedicated to machining the end portion of the pipe. Since a pipe may be released from a factory with the end portion thereof not beveled at a desired beveling angle. In this case, the end portion of the pipe needs to be first beveled prior to severing and beveling the intermediate portion of the pipe. The orbital pipe cutting device 100 according to the present invention may be used to machine an end portion of a short pipe. The term "end portion" used herein does not refer to only the end of a pipe but may refer to a portion adjoining the end portion of a pipe. Accordingly, the orbital pipe cutting device 100 according to the present invention may perform not only a beveling work of a pipe end portion but also a ring machining work of a pipe end portion and a severing work of a short pipe.

No description is made on a control unit (not shown) for controlling the rotary body 120 and the cutting tool 130 in the orbital pipe cutting device 100 according to the present invention. However, there may be provided a control unit for controlling the movement of the cutting device 100 such as the rotation speed and angular rotation of the electric drive unit 180, the push-pull operation of the push unit 160 for advancing and retreating the cutting tool 130, the manipulation of the valves V1 and V2 for the selective operation of the cutting tools 130 and 130, the manipulation of the feed means 190 for moving the cutting tool 130 in the Z-axis direction and the movement of the chucks 200 and the chuck feed means 210. The control unit may control various kinds of sensors.

While not shown in the drawings, the orbital pipe cutting device 100 according to the present invention may be used as a hydraulic chucking device. Just like the cutting device 100, the hydraulic chucking device includes a rotary body and two or more jaws disposed within the rotary body to grip a workpiece.

Instead of the plurality of cutting tools 130 employed in the orbital pipe cutting device 100, jaws of a chuck may be mounted to a rotary body. The extension and retraction of the jaws may be controlled by the hydraulic closed circuit (HCC) and the pusher 162.

While certain preferred embodiments of the invention have been described above, the present invention is not limited to these embodiments. It is to be understood that various changes and modifications may be made without departing from the scope of the invention defined in the claims.

What is claimed is:

1. An orbital pipe cutting device for freely controlling advance and retreat of a cutting tool, comprising:
   a main body;
   a rotary body rotatable about an axis of rotation and coupled to one side of the main body and configured to allow a pipe to pass therethrough;
   a chuck installed on at least one of front and rear sides of the main body and configured to fix the pipe;
   a power transfer device installed in the main body and the rotary body,
   wherein the power transfer device is configured to transfer external power to the rotary body and comprises:
      at least one double-action interlocking cylinder mounted to a rear surface of the rotary body and provided with a rod protruding toward the main body;
      a push unit installed in the main body and provided with at least one pusher protruding toward the rotary body; and
      a bearing disposed between the at least one pusher of the push unit and the rod of the interlocking cylinder and configured to allow for relative rotation of the pusher and the rod and for transfer of power between the pusher and the rod; and
      a double-action hydraulic cylinder installed on a front side of the rotary body and connected to the interlocking cylinder via a hydraulic closed circuit (HCC);
   and
   a cutting tool mounted to a rod of the hydraulic cylinder and configured to reciprocate toward and away from a center of the rotary body along said axis of rotation.

2. The orbital pipe cutting device of claim 1, further comprising:
   a feed means installed in the main body and configured to enable the main body to reciprocate in an axial direction of the pipe perpendicular to said axis of rotation.

3. The orbital pipe cutting device of claim 1, further comprising:
   a chuck feed means installed in the chuck and configured to enable the chuck to reciprocate in an axial direction of the pipe perpendicular to said axis of rotation.

4. The orbital pipe cutting device of claim 1, wherein the bearing includes an inner race, a pair of mutually-overlapping outer races configured to surround an outer periphery of the inner race, and a plurality of rollers inserted between the inner race and the outer races such that the axes thereof intersect with each other, each of the pusher of the push unit and the rod of the interlocking cylinder connected to the corresponding one of the inner race and the outer races.

5. The orbital pipe cutting device of claim 1, wherein the cutting tool includes a plurality of cutting tools, the hydraulic cylinder connected to the cutting tool includes a plurality of hydraulic cylinders, and a valve for operating one of the hydraulic cylinders is installed on a line which interconnects the hydraulic cylinders and the interlocking cylinder.

6. The orbital pipe cutting device of claim 1, wherein the bearing is formed so as to have multiple stages, and a set of the pusher unit, the interlocking cylinder, the hydraulic cylinder and the cutting tool is connected to each of the multiple stages of the bearing such that a plurality of cutting tools is independently controlled.

7. An orbital pipe cutting device for freely controlling advance and retreat of a cutting tool, comprising:
   a main body;
   a rotary body rotatable about an axis of rotation and coupled to one side of the main body and configured to make rotation;
   a power transfer device installed in the main body and the rotary body,
      wherein the power transfer device is configured to transfer external power to the rotary body and comprises:
         at least one double-action interlocking cylinder mounted to a rear surface of the rotary body and provided with a rod protruding toward the main body;
         a push unit installed in the main body and provided with at least one pusher protruding toward the rotary body; and
         a bearing disposed between the at least one pusher of the push unit and the rod of the interlocking cylinder and configured to allow for relative rotation of the pusher and the rod and for transfer of power between the pusher and the rod; and
         a double-action hydraulic cylinder installed on a front side of the rotary body and connected to the interlocking cylinder via a hydraulic closed circuit (HCC);
   a cutting tool mounted to a rod of the hydraulic cylinder and configured to reciprocate toward and away from a center of the rotary body along said axis of rotation; and
   a chuck installed on a front side of the main body and configured to fix a pipe such that an end portion of the pipe is placed within a machining range of the cutting tool.

* * * * *